United States Patent
Lin et al.

(10) Patent No.: US 12,282,370 B2
(45) Date of Patent: Apr. 22, 2025

(54) UNINTERRUPTED MAGNETIC BEARING POWER CONTROL FOR POWER FAILURE AND RECOVERY

(71) Applicant: Midea Group Co., Ltd., Foshan (CN)

(72) Inventors: Huaiyu Lin, San Jose, CA (US); Zhongfan Zhao, San Jose, CA (US); Zhengyun Ran, Foshan (CN); Fei Qiao, Foshan (CN)

(73) Assignee: MIDEA GROUP CO., LTD., Foshan (CN)

(*) Notice: Subject to any disclaimer, the term of this patent is extended or adjusted under 35 U.S.C. 154(b) by 270 days.

(21) Appl. No.: 17/719,113

(22) Filed: Apr. 12, 2022

(65) Prior Publication Data
US 2023/0324972 A1 Oct. 12, 2023

(51) Int. Cl.
*G06F 1/3206* (2019.01)
*H02K 1/27* (2022.01)

(52) U.S. Cl.
CPC .......... *G06F 1/3206* (2013.01); *H02K 1/27* (2013.01)

(58) Field of Classification Search
CPC .......... G06F 1/3206; H02K 1/27; H02K 7/09; H02P 5/60; H02P 25/03; H02P 29/025
See application file for complete search history.

(56) References Cited

U.S. PATENT DOCUMENTS

| | | | | |
|---|---|---|---|---|
| 6,815,924 B1* | 11/2004 | Iura | ......... | H02P 1/029 318/727 |
| 7,116,066 B2 | 10/2006 | Lin | | |
| 2007/0063661 A1* | 3/2007 | Galli | ......... | H02P 3/06 318/109 |
| 2014/0365151 A1* | 12/2014 | Han | ......... | H02M 3/156 702/64 |
| 2015/0171776 A1* | 6/2015 | Ota | ......... | B60L 9/22 318/8 |
| 2020/0300601 A1* | 9/2020 | Mori | ......... | G01B 7/30 |

\* cited by examiner

*Primary Examiner* — Kim Huynh
*Assistant Examiner* — Amanda Mendoza
(74) *Attorney, Agent, or Firm* — Morgan, Lewis & Bockius LLP (57) ABSTRACT

A power control system includes a current sensor and a control unit. The current sensor is coupled to a permanent magnet synchronous motor (PMSM) and is configured to monitor a current profile of the PMSM. The control unit is coupled to the PMSM and a magnetic bearing system. The control unit receives signals associated with the current profile of the PMSM and controls power provided by a main power supply to the PMSM in a first operating mode. In response to detecting a power failure of the main power supply, the control unit determines an estimated rotation speed of the PMSM according to the current profile of the PMSM and generates a first output voltage to power the magnetic bearing system in a second operating mode different from the first operating mode. A value of the first output voltage is generated based on the estimated rotation speed of the PMSM.

16 Claims, 7 Drawing Sheets

┌─────────────────────────────────────────────────────────────────┐
│ At a control unit that is coupled to a magnetic bearing system and a permanent magnet ┤── 502
│ synchronous motor (PMSM), wherein the magnetic bearing system and the PMSM are │
│ powered by a main power supply: │
│ │
│ ┌─────────────────────────────────────────────────────────────┐ │
│ │ wherein the control unit, the magnetic bearing system, and the PMSM are part of a │─ 504
│ │ compressor assembly │ │
│ └─────────────────────────────────────────────────────────────┘ │
│ │
│ ┌─────────────────────────────────────────────────────────────┐ │
│ │ Monitoring, by a current sensor, a current profile of the PMSM │── 506
│ │ ┌───────────────────────────────────────────────────────┐ │ │
│ │ │ wherein the current profile includes information of three phases of a current │─ 508
│ │ └───────────────────────────────────────────────────────┘ │ │
│ └─────────────────────────────────────────────────────────────┘ │
│ │
│ ┌─────────────────────────────────────────────────────────────┐ │
│ │ Receiving, from the current sensor, signals associated with the current profile of the │── 510
│ │ PMSM, and controlling power provided to the PMSM in a first operating mode │ │
│ └─────────────────────────────────────────────────────────────┘ │
│ │
│ ┌─────────────────────────────────────────────────────────────┐ │
│ │ In response to detecting a power failure of the main power supply: │── 512
│ │ ┌───────────────────────────────────────────────────────┐ │ │
│ │ │ Detecting a power failure of the main power supply includes detecting more │─ 514
│ │ │ than a threshold amount of decrease in a threshold amount of time in a │ │
│ │ │ voltage supplied by the main power supply │ │
│ │ └───────────────────────────────────────────────────────┘ │ │
│ │ │── 516
│ │ ┌───────────────────────────────────────────────────────┐ │ │
│ │ │ Detecting a power failure of the main power supply includes detecting more │ │
│ │ │ than a threshold amount of decrease in a threshold amount of time in a │ │
│ │ │ current supplied by the main power supply │ │
│ │ └───────────────────────────────────────────────────────┘ │ │
│ │ ┌───────────────────────────────────────────────────────┐ │ │
│ │ │ Determining an estimated rotation speed of the PMSM according to the │── 518
│ │ │ current profile │ │
│ │ │ ┌─────────────────────────────────────────────────┐ │ │
│ │ │ │ the estimated rotation speed of the PMSM is determined based on an │─ 538
│ │ │ │ estimated load torque of the PMSM │ │ │
│ │ │ └─────────────────────────────────────────────────┘ │ │
│ │ └───────────────────────────────────────────────────────┘ │ │
│ │ │
│ │ ┌───────────────────────────────────────────────────────┐ │── 520
│ │ │ Generating a first output voltage to power the magnetic bearing system in a │ │
│ │ │ second operating mode based on the estimated rotation speed of the PMSM │ │
│ │ │ (A) │ │
│ │ └───────────────────────────────────────────────────────┘ │
│ │ │
│ │ (B) │
└─────────────────────────────────────────────────────────────────┘

In response to the control unit detecting a power recovery of the main power supply after detecting the power failure: — 532

Determining an estimated rotating angle of the PMSM according to the current profile — 534

Generating a second output voltage based on the estimated rotating angle of the PMSM to adjust power provided to the PMSM without slowing down a rotation speed of the PMSM — 536

FIG. 5C

UNINTERRUPTED MAGNETIC BEARING POWER CONTROL FOR POWER FAILURE AND RECOVERY

TECHNICAL FIELD

The disclosed embodiments relate generally to a power control system for a magnetic bearing system, in particular in the presence of a permanent magnet synchronous motor (PMSM).

BACKGROUND

Magnetic bearing systems are oil-free bearing systems that use electromagnetic forces to maintain relative positions of a rotating assembly (rotor) to a stationary component (stator). An advantage of magnetic bearing is that there is no requirement for lubrication and maintenance, allowing higher rates of vacuum to reduce dynamic losses. Some advance magnetic bearing systems can adjust the electromagnetic forces in response to forces generated from machine operation. Magnetic bearing systems are widely used in industrial machines such as compressors, turbines, pumps, motors, and generators. Magnetic bearing systems typically require an external power source to operate. In some cases, an uninterrupted power supply (UPS) is used to supply power to the magnetic bearing system during a power failure of the main external power supply of the magnetic bearing system.

SUMMARY

A known difficulty with the use of a magnetic bearing system is to supply power to the magnetic bearing during a power failure of an external main power supply. For example, the energy stored in an associated energy storage component (e.g., a DC link bus capacitor) may be depleted within one tenth of a second from an occurrence of a power failure. While it is known to use auxiliary or back-up power supplies to the system, such as an uninterruptible power supply (UPS), such auxiliary power supplies are relatively expensive and require additional switching controls (and therefore more time) to enable the auxiliary supply to take over when the main power supply fails. Further, the conventional auxiliary or back-up power supplies often have a limited life and generally must be replaced every two years. This adds substantial further costs to the system.

Additionally, in an event of a power recovery after a power failure of the main power supply, if at least one rotor in a PMSM has not come to a full stop, the power control system has no easy way of determining the real-time rotating angle of the rotor, and therefore the restored power cannot be provided to the PMSM immediately even when the power has been restored. In other words, some interruption or additional control and therefore more time is needed before supplying the restored power to the PMSM under such conditions.

Accordingly, there is a need for an improved power control system for a magnetic bearing system that is able to maintain an uninterrupted power supply to the magnetic bearing system in an event of a power failure and allows uninterrupted bearing levitation.

Some embodiments of the present disclosure provide an improved power control system comprising a current sensor and a control unit. The current sensor is coupled to a permanent magnet synchronous motor (PMSM) and configured to monitor a current profile of the PMSM. The control unit is coupled to the PMSM and a magnetic bearing system, and is configured to receive, from the current sensor, signals associated with the current profile of the PMSM, and control power provided by a main power supply to the PMSM in a first operating mode. In addition, the control unit is configured to, in response to detecting a power failure of the main power supply of the PMSM and the magnetic bearing system, determine an estimated rotation speed of the PMSM according to the current profile of the PMSM and generate a first output voltage to power the magnetic bearing system in a second operating mode different from the first operating mode, wherein a value of the first output voltage is generated based on the estimated rotation speed of the PMSM.

In some embodiments, the control unit is further configured to reduce the value of the first output voltage in accordance with a determination that a DC voltage converted from the first output voltage exceeds a predetermined threshold. In some embodiments, the control unit is further configured to increase the value of the first output voltage in accordance with a determination that a DC voltage converted from the first output voltage is below a predetermined threshold.

In some embodiments, the control unit is further configured to, in response to the control unit detecting a power recovery of the main power supply after the power failure, determine an estimated rotating angle of the PMSM according to the current profile and generate a second output voltage based on the estimated rotating angle of the PMSM to adjust power provided to the PMSM without further slowing down the rotation speed of the PMSM.

In some embodiments, in response to detecting the power failure of the main power supply to the PMSM and the magnetic bearing system, the control unit is further configured to maintain a voltage applied to the magnetic bearing system such that the value of the voltage applied to the magnetic bearing system does not reduce in response to reduction of the estimated rotation speed of the PMSM.

In some embodiments, the current profile includes information of three phases of a current.

In some embodiments, the first output voltage to power the magnetic bearing system in the second operating mode and a current within the PMSM are configured to be opposite in phase. In some embodiments, the first output voltage to power the magnetic bearing system in the second operating mode and the current within the PMSM are configured to be opposite in phase by setting the reference rotation speed lower than the estimated rotation speed with the help of the control unit.

In some embodiments, the power control system is part of a compressor assembly.

In some embodiments, detecting a power failure of the main power supply includes detecting more than a threshold amount of decrease in a threshold amount of time in a voltage supplied by the main power supply. In some embodiments, detecting a power failure of the main power supply includes detecting more than a threshold amount of decrease in a threshold amount of time in the current supplied by the main power supply.

Thus, an improved power control system is provided for controlling magnetic bearing power supply during power failure and power recovery of a main power supply. The power control system in the present invention allows the main power supply to provide power to both the PMSM and the magnetic bearing system during normal operation (e.g., the first operating mode or drive mode). In an event of a power failure of the main power supply, the power control system allows the residual kinetic energy of the PMSM (e.g., from continued rotation of a rotor of the PMSM) to provide power to the magnetic bearing system, providing sufficient time (e.g., about ten seconds) for any backup power supply to kick in. Additionally, in an even of a power recovery of the main power supply, the power control system allows the recovered power to be supplied to the PMSM and the magnetic bearing system immediately without further delay or interruption.

BRIEF DESCRIPTION OF THE DRAWINGS

The embodiments disclosed herein are illustrated by way of an example, and not by a way of limitation, in the figures of the accompanying drawings. Like reference numerals refer to corresponding parts throughout the drawings and specification.

Listing of Symbols

The following table provides explanation of symbols referenced in the above mentioned drawings.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc., are, in some instances, used herein to describe various elements, these elements should not be limited by these terms. These terms are used only to distinguish one element from another. For example, a first voltage could be termed a second voltage, and similarly, a second voltage could be termed a first voltage, without departing from the scope of the various described embodiments. The first voltage and the second voltage are both voltages, but they are not the same voltage.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein

| Symbol | Explanation | Symbol | Explanation |
|---|---|---|---|
| $V_{DC}$ | DC bus voltage | $w^*_{m\_switch}$ | speed reference ($PI_4$) |
| $V_{a, b, c}$ | three phase terminal voltage of the PMSM | $w_o$ | output frequency of sinusoidal voltage supplied to the PMSM |
| $V_{qs}$ | q axis component of stator voltage | $w_{o, n}$ | output frequency of sinusoidal voltage supplied to the PMSM at $n^{th}$ step |
| $V_{ds}$ | d axis component of stator voltage | $\hat{\theta}$ | estimated rotating angle |
| $V_{qs\_regen}$ | q axis component of stator voltage in regeneration mode | $\hat{\theta}_n$ | estimated rotating angle at $n^{th}$ step |
| $V_{ds\_regen}$ | d axis component of stator voltage in regeneration mode | $T_L$ | estimated load torque |
| $i_{a, b, c}$ | three phase feedback current of the PMSM | C | capacitor in parallel with DC bus |
| $i_{qs}$ | q axis component of stator current | $p_L$ | load power |
| $i_{ds}$ | d axis component of stator current | $L_d$ | stator d axis inductance |
| $i_{qsLP}$ | q axis component of stator current after low-pass filter | $L_q$ | stator q axis inductance |
| $i_{dsLP}$ | d axis component of stator current after low-pass filter | R | stator resistance |
| $i^*_{qs}$ | q axis component of stator current reference | $\lambda$ | rotor flux linkage |
| $i^*_{ds}$ | d axis component of stator current reference | $k_1$ | constant |
| $i^*_{ds0}$ | initial value of $i^*_{ds}$ | $k_2$ | constant |
| $\Delta i_{ds, 1}$ | d axis stator current compensation from $PI_4$ | $k_3$ | constant |
| $\Delta i_{ds, 2}$ | d axis stator current compensation from $PI_5$ | $k_5$ | constant |
| $\hat{w}_m$ | estimated rotation speed | $k_{i_{ds}, 1}$ | integral gain of $PI_4$ |
| $w^*_m$ | speed reference in drive mode ($PI_1$) | $k_{i_{ds}, 2}$ | integral gain of $PI_5$ |
| $w_{m\_regen}$ | speed reference in regeneration mode ($PI_1$) | $T_s$ | sampling time |
| J | moment of inertia | | | refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
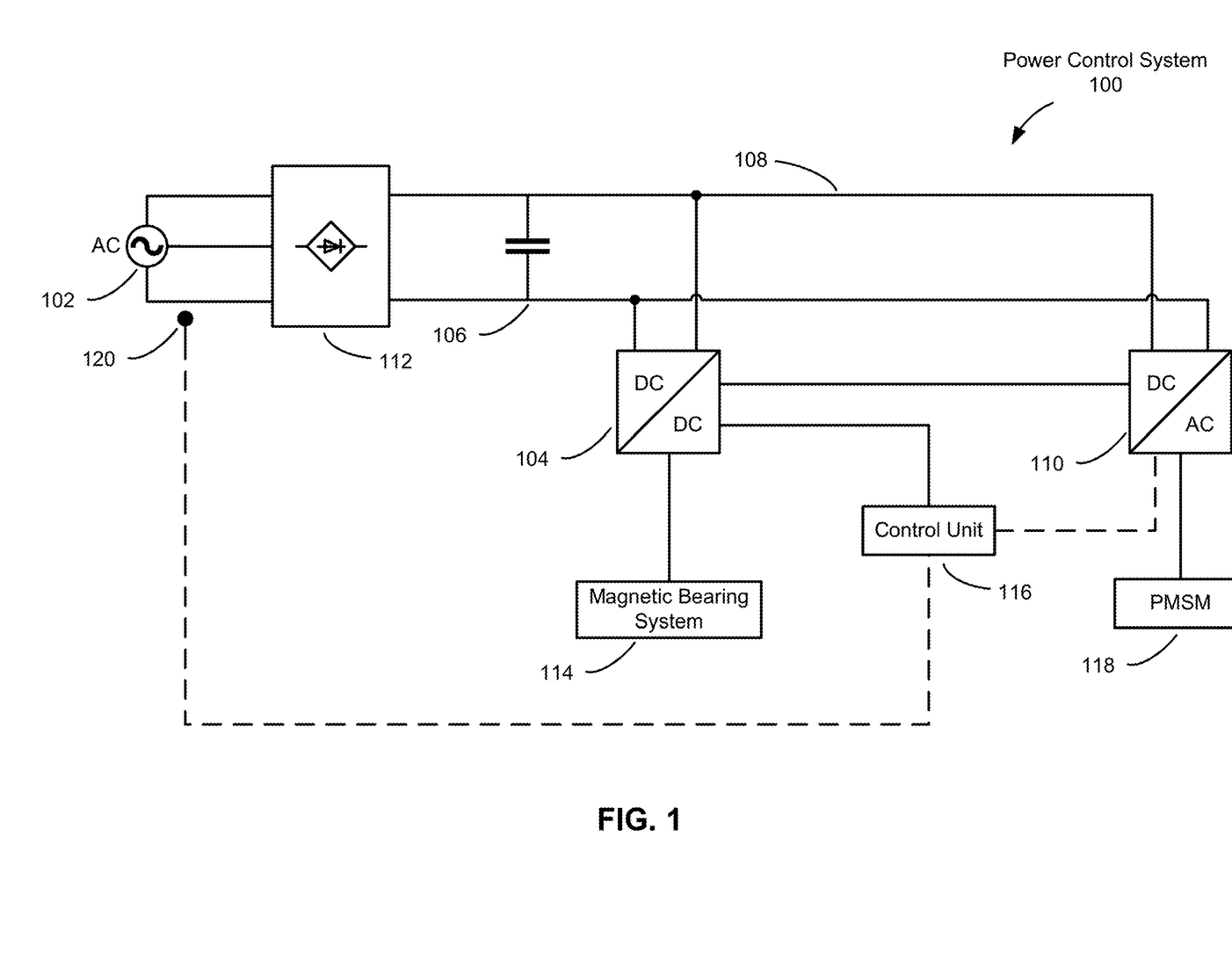
FIG. 1 is a block diagram illustrating a power control system, in accordance with some embodiments.

FIG. 1 is a block diagram illustrating a power control system, in accordance with some embodiments. The power control system 100 is connected to a main power supply (e.g., a three-phase AC power supply) through a bridge rectifier 112. A DC link bus 108 supplies DC power to a DC/DC converter 104 and a DC/AC inverter 110. A capacitor 106 or capacitor bank is connected across the DC link bus 108 to provide a buffer of stored power for motor run down. In some embodiments, the DC link bus voltage (e.g., $V_{DC}$) is about 500 to 600V and the capacitor 106 or capacitor bank may have a capacitance sufficient for a motor without load run down time of about 0.1 second to about 1.5 second, in the absence of any external power source.

The DC/DC converter 104 provides low voltage DC power for a control unit 116, and a magnetic bearing system 114, and certain components of a DC/AC inverter 110 (e.g., gate drivers and their isolated power supplies, isolated voltage and current sensors, and logic devices). In some embodiments, the low voltage DC supplied by the DC/DC converter 104 to the magnetic bearing system 114 is about 350V. The DC/DC converter 104 also supplies low voltage power for various sensors associated with the magnetic bearing system 114, the DC/DC converter 104, and/or the DC/AC inverter 110. The DC/AC inverter 110 converts the DC voltage supplied from the DC link bus 108 to AC voltage, which is used to supply power to the permanent magnet synchronous motor (PMSM) 118.

An AC current sensor 120 monitors the voltage and/or current of the main power supply 102 and provides a signal to the control unit 116 in an event of a failure of the main power supply 102. Alternatively, the control unit may also monitor the voltage of the DC link bus 108 to detect power failure of the main power supply 102, which results in a voltage drop across the capacitors 106. The control unit 116 also monitors the status of the PMSM 118, including current and/or voltage information of the PMSM 118.

In an event of a power failure of the main power supply 102, the capacitor 106 still stores some amount of energy that will soon be depleted by supplying power to the magnetic bearing system 114 and the PMSM 118. Before energy depletion of the capacitor 106, the control unit switches from a first operating mode (e.g., drive mode) to a second operating mode (e.g., regeneration mode). By controlling the voltage (e.g., voltage phase) applied to the PMSM 118, the control unit allows the energy to flow from the PMSM 118 to the DC link bus 108, powering the DC/DC converter 104, which ultimately provides continued power to the magnetic bearing system 114 for a certain period of time during the main power supply 102 has failed and unable to supply power to the magnetic bearing system 114 and the control circuitry of the PMSM 118. Since the control unit 116 monitors current and/or voltage information of the PMSM 118, it can therefore control the power supplied to the DC link bus 108 from the PMSM 118 and ultimately controls the power supplied to the magnetic bearing system 114 through the DC/DC converter 104 such that the magnetic bearing system 114 is supplied with an appropriate voltage for it to operate in a desired condition (e.g., avoid sudden stall of the PMSM rotor and enabling a gradual transition from high speed rotation to a stopped state then landed on the touch-down bearing, or operating freely from touch-down bearing for a short period of time until the main power is restored) even when the main power supply 102 has failed. In some embodiments, the control unit is implemented algorithm in a microprocessor, an embedded system, or other suitable hardware. By having a magnetic bearing system and a PMSM in the same system, such as a refrigeration compressor, both the energy and signal transmission efficiency are improved.

Figure 2:
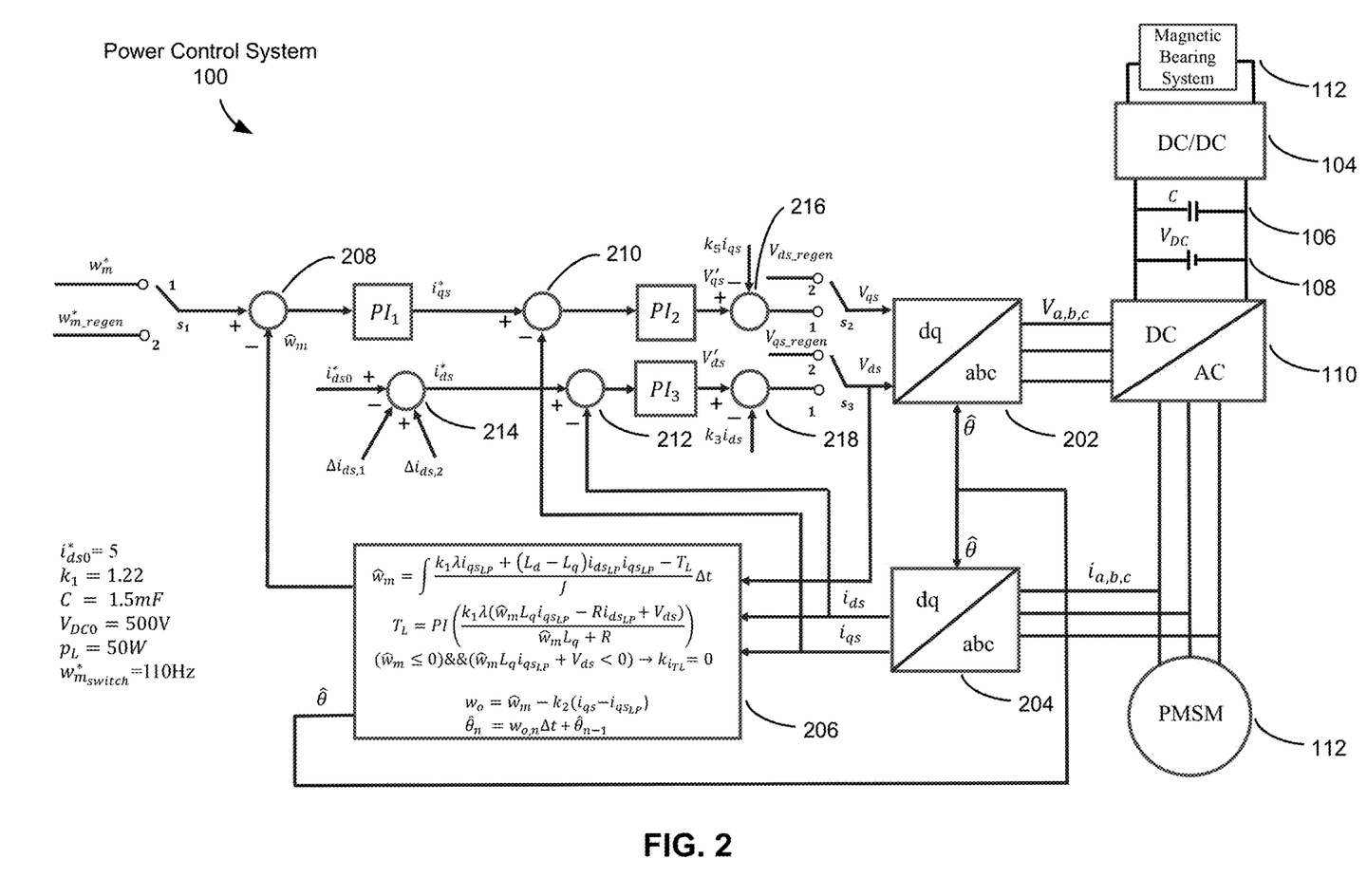
FIG. 2 is a block diagram illustrating a power control system in more details, in accordance with some embodiments.

FIG. 2 is a block diagram illustrating a power control system in more details, in accordance with some embodiments. The power control system 100 as shown in FIG. 2 includes multiple switches (e.g., s1, s2, and s3), proportional-integral (PI) controllers (e.g., $PI_1$, $PI_2$, and $PI_3$), and subtraction calculators (e.g., 208, 210, 212, 214, 216, and 218).

When $V_{DC}$ on the DC link bus 108 is provided by the main power supply 102, the control unit 116 (or the power control system 100) works in a first operating mode (e.g., drive mode). When in the first operating mode (e.g., the drive mode), switches s1, s2, and s3 are all switched to state 1. The control unit 116 feeds the speed reference in drive mode ($w^*_m$) to $PI_1$ and compares it against an estimated rotation speed ($\hat{w}_m$) of the PMSM (e.g., an estimated rotation speed of at least one rotor of the PMSM 118). $PI_1$ outputs a q axis component of stator current reference (e.g., a torque current, $i^*_{qs}$) which is compared against a q axis component of stator current ($i_{qs}$), which is derived from a detected current of the PMSM (e.g., a three-phase feedback current of the permanent magnet electric motor $i_{a,b,c}$). In some embodiments, the control unit monitors $i_{a,b,c}$ in real time. Output of $PI_2(V'_{qs})$ is compared with $k_5 i_{qs}$ at the subtraction calculator 216, where $k_5$ is a constant. Since switch s2 is at state 1, the difference between $V'_{qs}$ and $k_5 i_{qs}$ becomes a q axis component of stator voltage ($V_{qs}$) which is fed into the dq/abc inverter 202 in order to generate a first output voltage (e.g., a three-phase terminal voltage of the PMSM 118, or $V_{a,b,c}$). $V_{a,b,c}$ is fed into the DC/AC inverter 110 to form a control loop to control the voltage applied to the PMSM 118 in drive mode.

Figure 3:
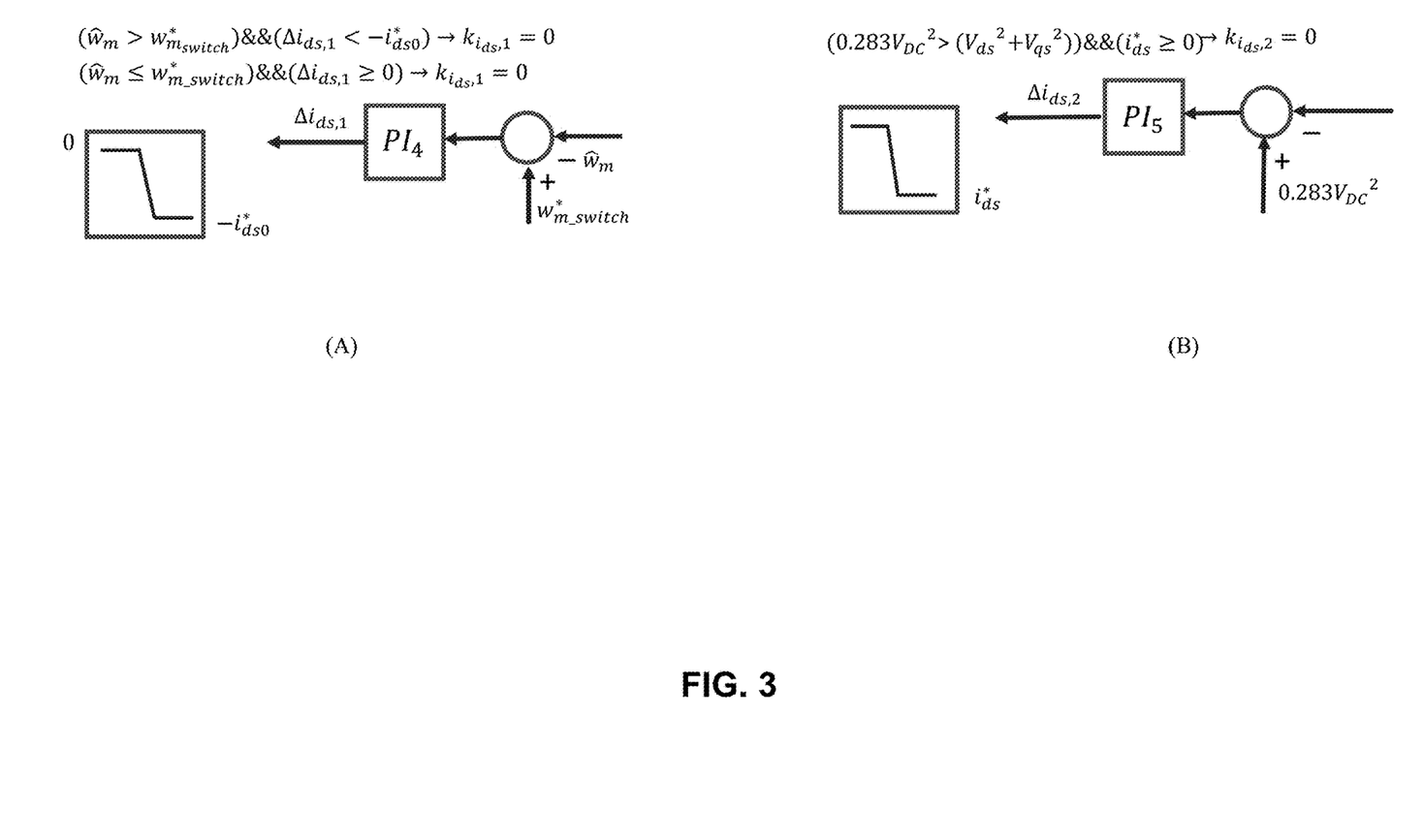
FIG. 3 is a block diagram illustrating components of a power control system, in accordance with some embodiments.

As shown in FIG. 2, the dq/abc inverter 202 also needs a d axis component of stator voltage ($V_{ds}$) in order to determine the first output voltage (e.g., $V_{a,b,c}$) to maintain proper magnetizing current. When the PMSM 118 is in a static mode (e.g., the at least one rotor of the PMSM is not rotating) and is first powered by the main power supply 102, an initial rotating angle of the PMSM (e.g., the initial rotating angle of the at least one rotor of the PMSM 118) needs to be determined. Thus, an initial value ($i^*_{ds0}$) of $i^*_{ds}$ is provided, which is eventually reduced to substantially zero by comparing against a d axis stator current compensation ($\Delta i_{ds,1}$) when the PMSM gets higher speed. $i^*_{ds}$ is a d axis component of stator current reference (e.g., a magnetizing current). $\Delta i_{ds,1}$ is generated from a PI controller (e.g., $PI_4$) as shown in FIG. 3(A) which takes the estimated rotation speed of the PMSM ($\hat{w}_m$) and a speed reference $w^*_{m\_switch}$ as input. As shown in FIG. 3(A), if ($\hat{w}_m > w^*_{mswitch}$) and ($\Delta i_{ds,1} < -i^*_{ds0}$), the integral gain of $PI_4(k_{i_{ds,1}})$ is set to 0. If ($\hat{w}_m \leq w^*_{m\_switch}$) and ($\Delta i_{ds,1} \geq 0$), $k_{i_{ds,1}}$ is also set to 0. Since the initial rotating angle of the PMSM 118 is known, the control unit is able to keep track (e.g., by monitoring $i_{a,b,c}$) of the rotating angle of the PMSM in real time (e.g., calculating estimated rotating angle $\hat{\theta}$).

Additionally, when in the first operation mode (e.g., the drive mode), as an amplitude of the line to line voltage of $V_{a,b,c}$ increases and reaches the maximum amplitude of the main power supply 102 (e.g., when $0.283V_{DC}^2 > (V_{ds}^2 + V_{qs}^2)$), $i^*_{ds}$ is reduced by using a PI controller (e.g., $PI_5$) in order to further increase $i_{qs}$ associated with $i_{a,b,c}$. As shown in FIG. 3(B), if $(0.283V_{DC}^2 > (V_{ds}^2 + V_{qs}^2))\&\&(i^*_{ds} \geq 0)$, the integral gain of $PI_5$ ($k_{i_{ds,2}}$) is set to 0.

Referring back to FIG. 2, $i^*_{ds}$ is compared against a d axis component of stator current ($i_{ds}$). Output of $PI_3$ ($V'_{ds}$) is subtracting $k_3 i_{ds}$ at the subtraction calculator 218, where $k_3$ is a constant. Since switch s3 is at state 1, the difference between $V'_{ds}$ and $k_3 i_{ds}$ becomes a d axis component of stator voltage ($V_{ds}$), which is fed into the dq/abc inverter 202 together with $V_{qs}$ to calculate $V_{a,b,c}$.

When the main power supply 102 fails, the control unit 116 detects such failure by monitoring the current of the main power supply 102 with an AC current sensor 120. When a power failure of the main power supply 102 is detected, the control unit 116 (or the power control system 100) works in a second operating mode (e.g., regeneration mode). Switches s1, s2, and s3 are all switched to state 2. The control unit sets a speed reference in regeneration mode ($w^*_{m\_regen}$), and a q axis component of stator voltage in regeneration mode ($V_{qs\_regen}$) becomes $V_{ds}$ and a d axis component of stator voltage in regeneration mode ($V_{ds\_regen}$) becomes $V_{qs}$.

Figure 4:
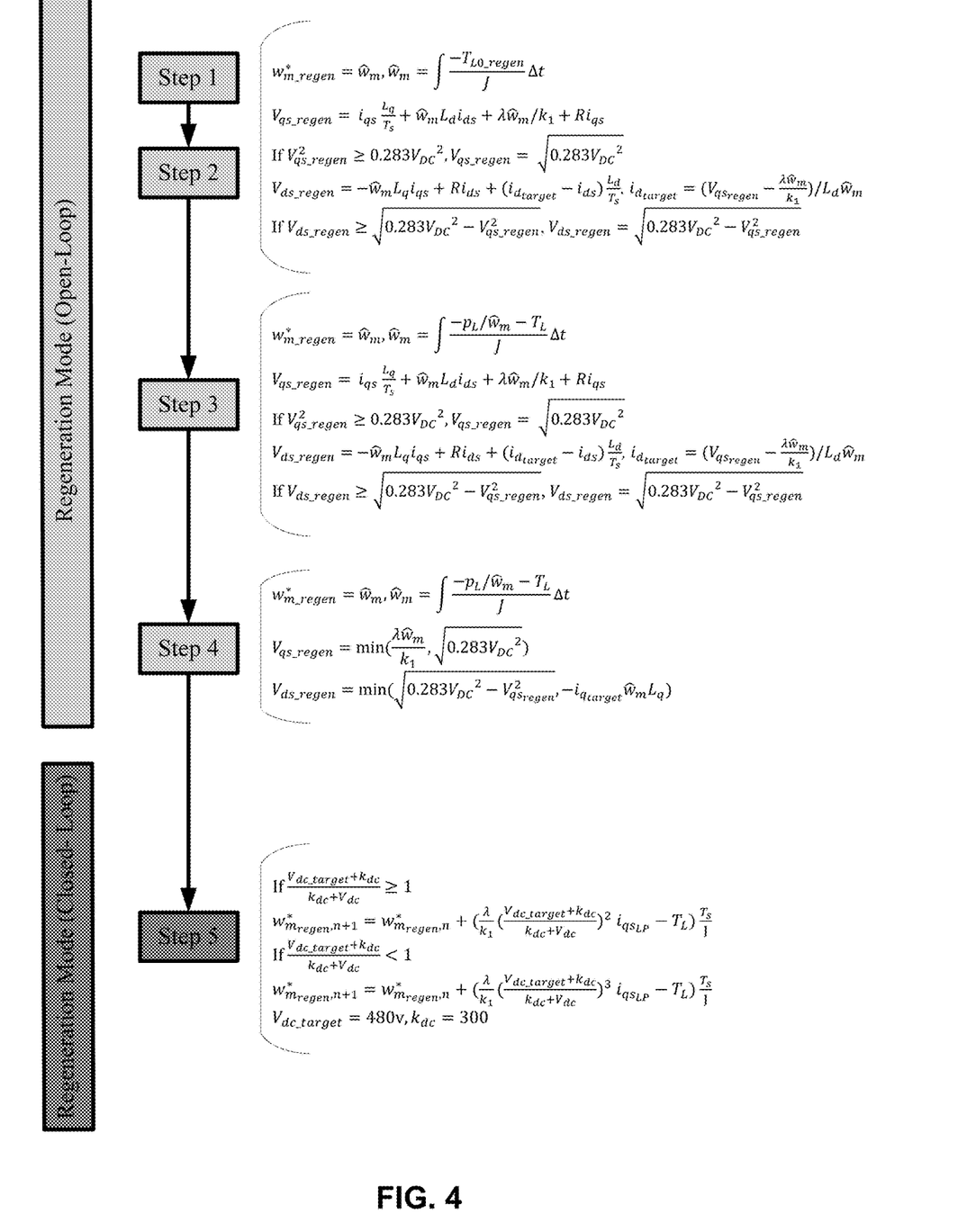
FIG. 4 illustrates an example of a control process performed by a power control system, in accordance with some embodiments.

Specifically, the analysis unit 106 of the control unit 116 takes a q axis component of stator current ($i_{qs}$) and a d axis component of stator current ($i_{ds}$), both of which are transformed from $i_{a,b,c}$ using a dq/abc converter 204. As shown in FIG. 2, the analysis unit 206 first calculates an estimated rotation speed of the PMSM ($\hat{w}_m$), wherein $k_1$ is a constant, $\lambda$ is the rotor flux linkage, $i_{qs_{LP}}$ is a q axis component of stator current after low-pass filter, $i_{ds_{LP}}$ is a d axis component of stator current after low-pass filter, $L_d$ is the stator d axis inductance, $L_q$ is the stator q axis inductance, $T_L$ is the estimated load torque, and $J$ is the moment of inertia. $T_L$ is calculated as $$PI\left(\frac{k_1\lambda(\hat{w}_m L_q i_{qs_{LP}} - Ri_{ds_{LP}} + V_{ds})}{\hat{w}_m L_q + R}\right),$$

wherein R is the stator resistance. Additionally, if ($\hat{w}_m \leq 0$) &&($\hat{w}_m L_q i_{qs_{LP}} + V_{ds} < 0$), $k_{i_{T_L}}$ (coefficient for integral calculations) is set to be 0. Thus, the analysis unit 206 calculates the output frequency of voltage supplied to PMSM (e.g., frequency of $V_{a,b,c}$), which is used to calculate an estimated rotating angle at a particular time (e.g., at $n^{th}$ step, wherein step n may refer to steps 1-5 in FIG. 4).

In the present invention, the control unit 116 in the second operating mode (e.g., regeneration mode) sets the value of $w^*_{m\_regen}$ in a way such that the $V_{qs}$ and $i_{ds}$ are in opposite polarity and $V_{qs}$ and $i_{qs}$ are in opposite polarity (e.g., by setting $w^*_{m\_regen}$ to be smaller than $\hat{w}_m$). Under such conditions, $V_{a,b,c}$ are opposite in phase (e.g., 180 degree different) in phase (e.g., $V_a$ and $i_a$ are 180 degree different in phase, $V_b$ and $i_b$ are 180 degree different in phase, and $V_c$ and $i_c$ are 180 degree different in phase), allowing the PMSM 118 to output energy (i.e., instead of consuming energy as in the drive mode).

As shown in FIG. 2, in some embodiments, $i^*_{ds0}$ maybe 5, $k_1$ maybe 1.22, capacitance of the capacitor 106 may be 1.5 mF, DC bus link voltage in the drive mode ($V_{DC0}$) may be 500V, load power ($p_L$) of the magnetic bearing system may be 50 W, and $w^*_{m\_switch}$ may be 110 Hz.

FIG. 4 illustrates an example of a control process performed by a power control system, in accordance with some embodiments. Specifically, FIG. 4 illustrates 5 steps taken by the control unit 116 when it first enters into the second operating mode (e.g., regeneration mode). In some embodiments, steps 1-5 are five consecutive steps performed by the control unit 116 at five consecutive sampling time. This process aims to provide $V_{qs\_regen}$ and $V_{ds\_regen}$ such that $V_{qs\_regen}$ and $i_{ds}$ are in opposite polarity and $V_{ds\_regen}$ and $i_{qs}$ are in opposite polarity, allowing the energy to flow from the PMSM 118 to the magnetic bearing system 114.

In some embodiments, the control unit 116 first provides an open-loop control and then provides a close-loop control. In some embodiments, the open-loop control comprises four steps. As shown in FIG. 4, the first two steps (i.e., step 1 and step 2) involve the same process. For example, in step 1, $w^*_{m\_regen}$ is first set to $\hat{w}_m$ and $V_{qs\_regen}$ is also calculated using $\hat{w}_m$. If $V^2_{qs\_regen} \geq 0.283 V_{DC}^2$, $V_{qs\_regen}$ is reset to $\sqrt{0.283 V_{DC}^2}$. $V_{ds\_regen}$ is then calculated. If $V_{ds\_regen} \geq \sqrt{0.2893 V_{DC}^2 - V^2_{qs\_regen}}$, $V_{ds\_regen}$ is reset to $\sqrt{0.283 V_{DC}^2 - V^2_{qs\_regen}}$. In step 2 (e.g., at the next sampling time), the same process is performed by the control unit 116. In some embodiments, step 3 is similar to step 2, except that calculation of $\hat{w}_m$ is different. In some embodiments, the control unit 116 calculates in step 4 an estimated rotation speed of the PMSM ($\hat{w}_m$) in the same way as in step 3. $V_{qs\_regen}$ is set to min $$\left(\frac{\lambda \hat{w}_m}{k_1}, \sqrt{0.283\ V_{DC}^2}\right),$$

and $V_{ds\_regen}$ is set to min ($\sqrt{0.283 V_{DC}^2 - V^2_{qs_{regen}}}, -i_{q_{target}} \hat{w}_m L_q$).

In some embodiments, starting from step 5 (e.g., at step 5 and the following sample times until recovery of the main power supply is detected), the control unit 116 provides a closed-loop control. For example, if $$\frac{V_{dc\_target} + k_{dc}}{k_{dc} + V_{dc}} \geq 1,$$

$$w^*_{m_{regen},n+1} = w^*_{m_{regen},n} + \left(\frac{\lambda}{k_1}\left(\frac{V_{dc\_target} + k_{dc}}{k_{dc} + V_{dc}}\right)^2 i_{qs_{LP}} - T_L\right)\frac{T_s}{J},$$

wherein $w^*_{m_{regen},n}$ is $w^*_{m\_regen}$ is set by the control unit 116 at $n^{th}$ step, wherein $n \geq 4$.

Since the control unit 116 receives input regarding the initial rotating angle of the PMSM and is able to keep track (e.g., by monitoring $i_{a,b,c}$) of the rotating angle of the PMSM in real time (e.g., estimated rotating angle $\hat{\theta}$), in some embodiments, when the external power comes back (e.g., the main power supply 102 recovers), such external power can be fed to the PMSM immediately without delay (e.g., no additional interruption, such as waiting for the at least one rotor of the PMSM to slow down and eventually stop and re-determine the initial rotating angle of the PMSM).

Figure 5A:
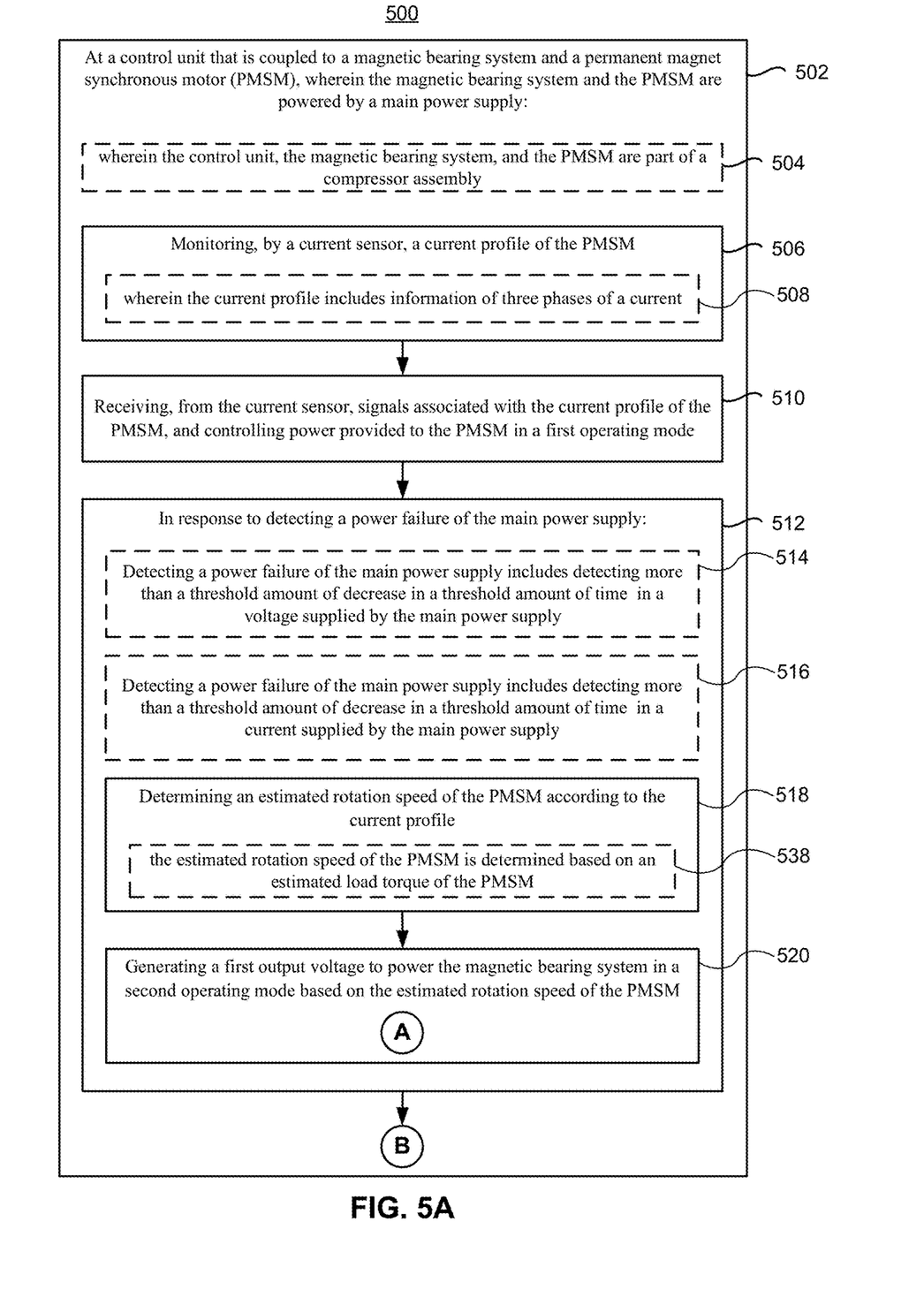
FIGS. 5A-5C are flow diagrams illustrating a method of controlling power provided to a magnetic bearing system, in accordance with some embodiments.
Figure 5B:
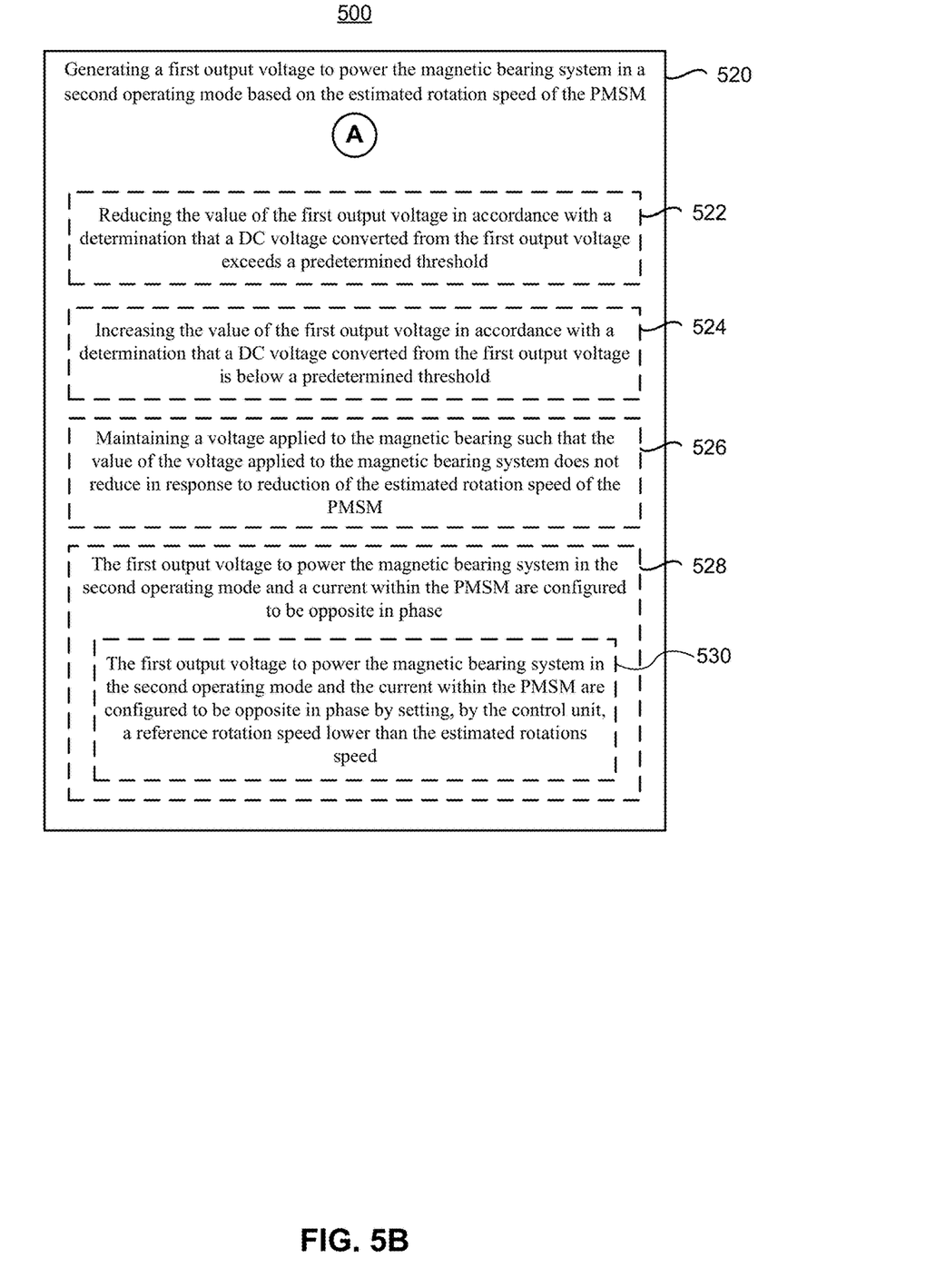
Figure 5C:
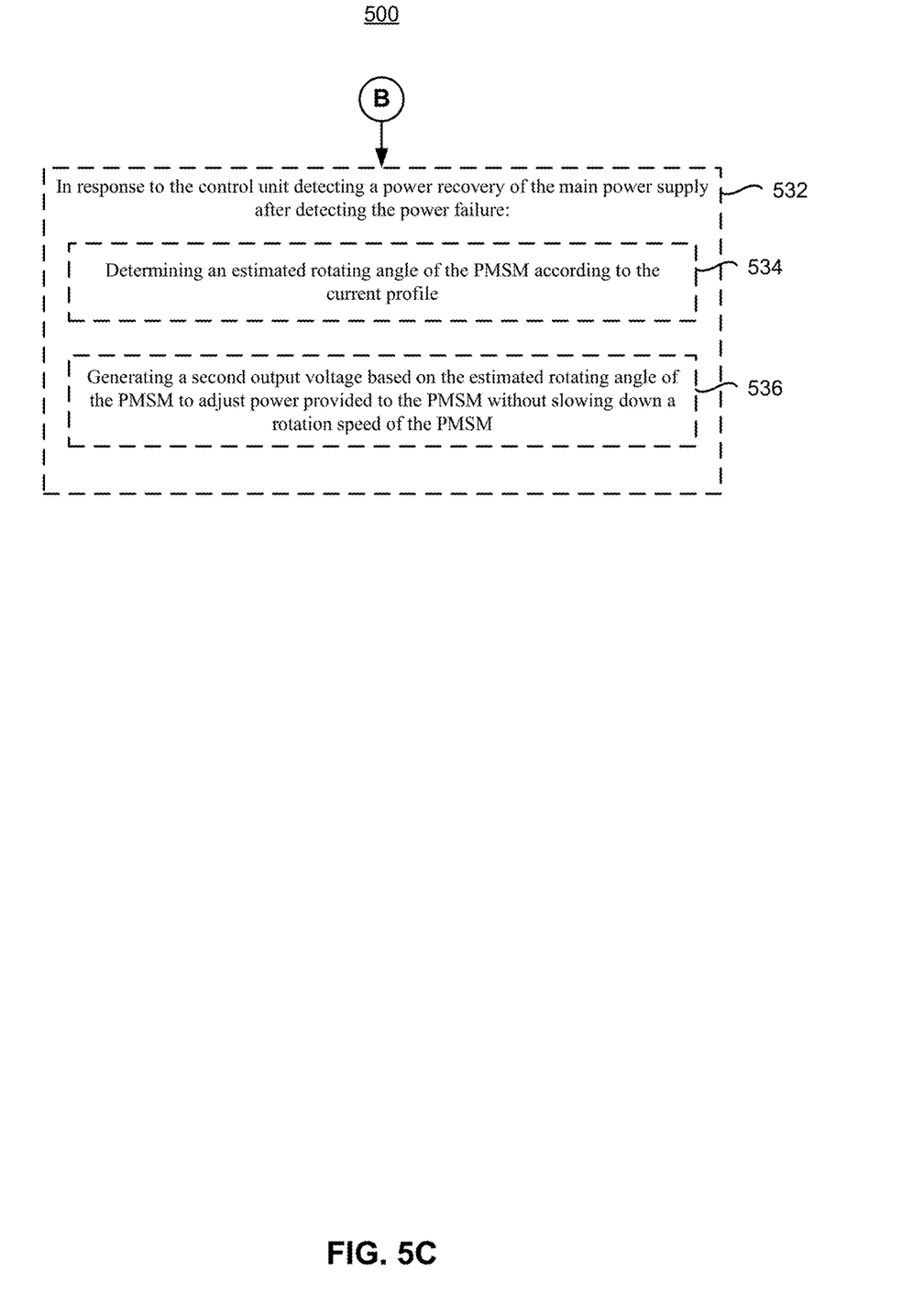

FIGS. 5A-5C are flow diagrams illustrating a method of controlling power provided to a magnetic bearing system, in accordance with some embodiments. Method 500 may be performed at a control unit (e.g., control unit 116). The control unit is coupled to a magnetic bearing system (e.g., magnetic bearing system 114) and a permanent magnet synchronous motor (PMSM) (e.g., PMSM 118). The magnetic bearing system and the PMSM are powered by a main power supply (e.g., main power supply 102). In some embodiments, the control unit, the magnetic bearing system, and the PMSM are part of a compressor assembly. For example, home appliances, such as refrigerator and freezer, may include at least a compressor assembly that includes the control unit, the magnetic bearing system, and the PMSM. As another example, large-scale air conditioning equipment, such as central air conditioning system for office buildings, stadium, and subways, may also include at least a compressor assembly that includes the control unit, the magnetic bearing system, and the PMSM. Depending on different the conditions (e.g., an area that needs to be cooled/heated by a central air conditioning system), a site (e.g., an office building or a subway station) may require only one compressor assembly. In some embodiments, a site may require more than one compressor assembly.

Method 500 includes monitoring (506), by a current sensor, a current profile of the PMSM. For example, in some embodiments, a current sensor may reside in the PMSM (e.g., PMSM 118). In some other embodiments, a current sensor may be a sensor external to the PMSM or reside in a component (e.g., DC/AC inverter 110) directly or indirectly connected to the PMSM. In some embodiments, the current profile includes information of three phases of a current (e.g., $i_{a,b,c}$).

Method 500 further includes receiving (510), from the current sensor, signals (e.g., $i_{a,b,c}$ and/or $i_{qs}$ and $i_{ds}$) associated with the current profile of the PMSM, and controlling power (e.g., $V_{a,b,c}$ and/or $i_{a,b,c}$) provided to the PMSM in a first operating mode (e.g., drive mode). In the first operating mode (e.g., drive mode), the magnetic bearing system (e.g., magnetic bearing system 114) and the PMSM (e.g., PMSM 118) are powered by the main power supply (e.g., main power supply 102). In this mode, electric energy flow from the main power supply to the magnetic bearing system and the PMSM. Additionally, the control unit (e.g., control unit 116), which is also powered by the main power supply, controls power provided to the PMSM to achieve a desired operation condition. In some embodiments, the control unit further controls the power (e.g., $V_{DC}$) provided to the magnetic bearing system by the main power supply to ensure that the magnetic bearing system operates under a desired condition.

In some embodiments, method 500 further comprises, in response to detecting (512) a power failure of the main power supply: determining (518) an estimated rotation speed of the PMSM (e.g., $\hat{w}_m$) according to the current profile (e.g., calculations performed in analysis unit 206) and generating (520) a first output voltage (e.g., $V_{a,b,c}$ and/or $V_{qs\_regen}$ and $V_{ds\_regen}$) to power the magnetic bearing in a second operating mode (e.g., regeneration mode) based on the estimated rotation speed of the PMSM (e.g., $\hat{w}_m$). In the second operation mode (e.g., regeneration mode), the main power supply no longer provides power to the magnetic bearing system or the PMSM. However, at the time the main power supply fails, the capacitor 106 as shown in FIG. 2 still has residual energy, and therefore the voltage supplied to the magnetic bearing system (e.g., $V_{DC}$) may still be maintained but for a very short period of time (e.g., 0.1 s to 1.5 s). Moreover, right after the main power supply fails, the at least one rotor in the PMSM is still rotating, and the resulting residual kinetic energy from the PMSM is controlled to power the magnetic power bearing system through the control unit. In some embodiments, the estimated rotation speed of the PMSM is determined (538) based on an estimated load torque of the PMSM, as shown in the analysis unit 206 in FIG. 2.

In some embodiments, detecting (512) a power failure of the main power supply includes detecting (514) more than a threshold amount of decrease in a threshold amount of time (e.g., a sudden decrease, with a steep step that is indicative of a power failure) in a voltage supplied by the main power supply. In some embodiments, detecting (512) a power failure of the main power supply includes detecting (516) a power failure of the main power supply includes detecting more than a threshold amount of decrease in a threshold amount of time (e.g., a sudden decrease, with a steep step that is indicative of a power failure) in a current supplied by the main power supply.

In some embodiments, when generating a first output voltage (e.g., $V_{a,b,c}$ and/or $V_{qs\_regen}$ and $V_{ds\_regen}$) to power the magnetic bearing system, the control unit is further configured to reduce (522) the value of the first output voltage in accordance with a determination that a DC voltage (e.g., $V_{DC}$) converted from the first output voltage exceeds a predetermined threshold. For example, if the voltage applied to capacitor 106 exceed a predetermined threshold value, the capacitor 106 may be damaged. As another example, the DC/DC converter 104 and DC/AC inverter 110 contains a number of power devices, such as insulator gate bipolar transistors (IGBT), which may be damaged if the voltage applied to the DC/DC converter 104 and DC/AC inverter 110 is too high. Thus, the control unit reduces the value of the first output voltage (e.g., amplitude of $V_{a,b,c}$) if a DC voltage (e.g., $V_{DC}$) converted from the first output voltage exceeds a predetermined threshold.

In addition, if the voltage applied to the DC/DC converter 104 and/or the DC/AC inverter 110 is too low, the current applied to the power devices within the DC/DC converter 104 and/or the DC/AC inverter 110 may become too high. Under such conditions, the high current will generate heat and damage those power devices. Therefore, in some embodiments, the control unit is further configured to increase (524) the value of the first output voltage in accordance with a determination that a DC voltage converted from the first output voltage is below a predetermined threshold.

In some embodiments, in response to detecting the power failure of the main power supply of the PMSM and the magnetic bearing system, the control unit is further configured to maintain (526) a voltage applied to the magnetic bearing such that the value of the voltage applied to the magnetic bearing does not reduce in response to reduction of the estimated rotation speed of the PMSM (e.g., $\hat{w}_m$). For example, in the second operating mode (e.g., regeneration mode), since the main power supply no longer provides power to the PMSM, rotation of the at least one rotor in the PMSM will gradually slow down and the EMF (electric motive force) of the PMSM will also reduce. As a consequence, the first output voltage generated by the control unit (e.g., $V_{a,b,c}$ and/or $V_{qs\_regen}$ and $V_{ds\_regen}$) also reduces, and so does a voltage applied to the magnetic bearing system (e.g., $V_{DC}$ or output of the DC/DC converter 104). However, the control unit may be configured to maintain the voltage applied to the magnetic bearing system even when the rotor's rotation speed is reduced. For example, the control unit may maintain the voltage applied to the magnetic bearing system by increasing a current supplied to the DC/DC converter 104, such that the power provided to the DC/DC converter 104 is maintain and therefore the voltage supplied to the magnetic bearing system is maintained. In some embodiment, reduction of the at least one rotor's rotation speed may be detected by monitoring the estimated rotation speed of the PMSM (e.g., $\hat{w}_m$). For example, as shown in step 5 of FIG. 4, when the estimated rotation speed of the PMSM (e.g., $\hat{w}_m$) reduces, calculation of $w^*_{m_{regen},n+1}$ takes into account of $V_{dc}$, which reflects the change in $\hat{w}_m$. By setting $w^*_{m_{regen},n+1}$ as illustrated in step 5 of FIG. 4, the control unit 116 is able to maintain the power provided to the DC/DC converter 104.

In some embodiments, in the second operating mode (e.g., regeneration mode), the first output voltage to power the magnetic bearing system in the second operating mode and the current within the PMSM are configured to be opposite in phase (e.g., 180 degrees different) in phase. Under such conditions, instead of consuming energy, the PMSM can output energy to power other associated components or devices (e.g., the associated magnetic bearing system). In some embodiments, such voltage-current relationship (i.e., 180 degrees different in phase) can be achieved within a very short period of time (e.g., no more than 150 μs) such that the energy stored in the DC link bus capacitor 106 (e.g., no more than 200 J) has not yet been depleted. In some embodiments, $V_{a,b,c}$ in sinusoidal form is transformed to $V_{qs}$ and $V_{ds}$ (both in DC form), and $i_{a,b,c}$ in sinusoidal form is transformed to $i_{qs}$ and $i_{ds}$ (both in DC form), for easier calculation and control. By controlling the $V_{ds}$ and $i_{ds}$ in opposite polarity and $V_{qs}$ and $i_{qs}$ in opposite polarity, the control unit may control $V_{a,b,c}$ and $i_{a,b,c}$ such that $V_a$ and $i_a$ are 180 degrees different in phase, $V_b$ and $i_b$ are 180 degrees different in phase, and $V_c$ and $i_c$ are 180 degrees different in phase.

In some embodiments, according to method 500, the control unit is further configured to, in response to the control unit detecting (532) a power recovery of the main power supply after detecting the power failure, determine (534) an estimated rotating angle of the PMSM (e.g., estimated rotating angle $\hat{\theta}$) according to the current profile (e.g., $i_{a,b,c}$ and/or $i_{qs}$ and $i_{ds}$) and generate (536) a second output voltage (e.g., $V_{a,b,c}$) with the appropriate phase relative to the estimated rotating angle of the PMSM (e.g., estimated rotating angle $\hat{\theta}$) to adjust power provided to the PMSM without slowing down the rotation speed of the PMSM. In some embodiments, detecting a power recovery of the main power supply includes detecting a voltage increase from the main power supply (e.g., $V_{a,b,c}$) or a current increase from the main power supply detected by an AC current sensor 120. In some other embodiments, detecting a power recovery of the main power supply includes detecting a voltage increase supplied to the DC/DC converter 104 (e.g., voltage VDC 108) such that the voltage supplied to the DC/DC converter 104 goes from below a predetermined voltage level to above the predetermined voltage level. For example, the voltage supplied to the DC/DC converter 104 in the first operating mode (e.g., drive mode) is maintained at a first voltage level (e.g., 500V). The control unit in the second operating mode (e.g., regeneration mode) controls voltage supplied to the DC/DC converter 104 to be at a second voltage level (e.g., 425V) that is below the first voltage level associated with the first operating mode (e.g., drive mode). In an event of power recovery, the voltage supplied to the DC/DC converter 104 will increase from the second voltage level (e.g., 425V) toward the first voltage level (e.g., 500V). Therefore, the control unit is able to detect a power recovery of the main power supply after detecting the power failure by comparing the real-time voltage supplied to the DC/DC converter 104 to a predetermined voltage level that is at least as high as the first voltage level (e.g., 500V).

In some embodiments, in response to the control unit detecting a power recovery of the main power supply after detecting the power failure, the control unit switches from the second operating mode (e.g., regeneration mode) back to the first operating mode (e.g., drive mode). In some embodiments, the control unit determines an estimated rotating angle of the PMSM (e.g., estimated rotating angle $\hat{\theta}$) according to the current profile by first calculating frequency information (e.g., $\hat{w}_m$ in the analysis unit 206). In some embodiments, since the control unit is aware of the estimated rotating angle of the PMSM (e.g., estimated rotating angle $\hat{\theta}$), the recovered power (e.g., the second output voltage) may be supplied to the PMSM immediately without delay (e.g., no additional interruption, such as waiting for the at least one rotor of the PMSM to slow down and eventually stop and re-determine the initial rotating angle of the PMSM again).

Although FIGS. 5A-5C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In some embodiments, an electronic device includes the functional blocks of described herein, and the functional blocks are, optionally, implemented by hardware, software, or a combination of hardware and software to carry out the principles of the various described embodiments. In some embodiments, the electronic device includes the control unit 116; a storage unit (e.g., memory, or SSD) configured to store instructions and data, and a processing unit coupled to the storage unit, the sensors, the magnetic bearing system, and the PMSM, etc. In some embodiments, features described herein may be implemented using a processing system. Exemplary processing systems (e.g., processor(s)) include, without limitation, one or more general purpose microprocessors (for example, single or multi-core processors), application-specific integrated circuits, application-specific instruction-set processors, field-programmable gate arrays, graphics processors, physics processors, digital signal processors, coprocessors, network processors, audio processors, encryption processors, and the like. In some embodiments, features of the present technology can be implemented in, using, or with the assistance of a computer program product, such as a storage medium (media) or computer readable storage medium (media) having instructions stored thereon/in which can be used to program a processing system to perform any of the features presented herein. The storage medium (e.g., memory) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data. In some embodiments, stored on any one of the machine readable medium (media), features of the present technology can be incorporated in software and/or firmware for controlling the hardware of a processing system, and for enabling a processing system to interact with other mechanism utilizing the results of the present technology. Such software or firmware may include, but is not limited to, application code, device drivers, operating systems, and execution environments/containers. In some embodiments, the present technology utilizes communication systems to optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A power control system, comprising:
    a current sensor, the current sensor being coupled to a permanent magnet synchronous motor (PMSM) and configured to monitor a current profile of the PMSM;
    a control unit, wherein the control unit is coupled to the PMSM and a magnetic bearing system, and is configured to receive, from the current sensor, signals associated with the current profile of the PMSM, and control power provided by a main power supply to the PMSM in a first operating mode, and wherein the control unit is configured to:
        in response to detecting a power failure of the main power supply of the PMSM and the magnetic bearing system, while the main power supply remains failed:
            determine an estimated rotation speed of the PMSM according to the current profile of the PMSM; and
            generate, from the PMSM, a first output voltage to power the magnetic bearing system in a second operating mode different from the first operating mode, wherein a value of the first output voltage is generated based on the estimated rotation speed of the PMSM, the value of the first output voltage including a phase configured to be opposite to a current phase within the PMSM;
        in response to the control unit detecting a power recovery of the main power supply after detecting the power failure:
            determine an estimated rotating angle of the PMSM according to the current profile; and
            generate a second output voltage based on the estimated rotating angle of the PMSM to adjust power provided to the PMSM without slowing down a rotation speed of the PMSM, including calculating a phase of the second output voltage relative to the estimated rotating angle of the PMSM.

2. The power control system of claim 1, wherein the control unit is further configured to reduce the value of the first output voltage in accordance with a determination that a direct current (DC) voltage converted from the first output voltage exceeds a predetermined threshold.

3. The power control system of claim 1, wherein the control unit is further configured to increase the value of the first output voltage in accordance with a determination that a DC voltage converted from the first output voltage is below a predetermined threshold.

4. The power control system of claim 1, wherein in response to detecting the power failure of the main power supply of the PMSM and the magnetic bearing system, the control unit is further configured to:
    maintain a voltage applied to the magnetic bearing system such that the value of the voltage applied to the magnetic bearing system does not reduce in response to reduction of the estimated rotation speed of the PMSM.

5. The power control system of claim 1, wherein the first output voltage to power the magnetic bearing system in the second operating mode and the current within the PMSM are configured to be opposite in phase by setting, by the control unit, a reference rotation speed lower than the estimated rotation speed.

6. The power control system of claim 1, wherein detecting a power failure of the main power supply includes detecting more than a threshold amount of decrease in a threshold amount of time in a voltage supplied by the main power supply.

7. The power control system of claim 1, wherein detecting a power failure of the main power supply includes detecting more than a threshold amount of decrease in a threshold amount of time in a current supplied by the main power supply.

8. The power control system of claim 1, wherein the estimated rotation speed of the PMSM is determined based on an estimated load torque of the PMSM.

9. A method, comprising:
    at a control unit that is coupled to a magnetic bearing system and a permanent magnet synchronous motor (PMSM), wherein the magnetic bearing system and the PMSM are powered by a main power supply:
        monitoring, by a current sensor, a current profile of the PMSM;
        receiving, from the current sensor, signals associated with the current profile of the PMSM, and controlling power provided by the main power supply to the PMSM in a first operating mode;
        in response to detecting a power failure of the main power supply, while the main power supply remains failed:
            determining an estimated rotation speed of the PMSM according to the current profile;
            generating, from the PMSM, a first output voltage to power the magnetic bearing system in a second operating mode based on the estimated rotation speed of the PMSM, the value of the first output voltage including a phase configured to be opposite to a current phase within the PMSM;
        in response to the control unit detecting a power recovery of the main power supply after detecting the power failure:
            determine an estimated rotating angle of the PMSM according to the current profile; and generate a second output voltage based on the estimated rotating angle of the PMSM to adjust power provided to the PMSM without slowing down a rotation speed of the PMSM, including calculating a phase of the second output voltage relative to the estimated rotating angle of the PMSM.

10. The method of claim 9, further comprising:
reducing the value of the first output voltage in accordance with a determination that a direct current (DC) voltage converted from the first output voltage exceeds a predetermined threshold.

11. The method of claim 9, further comprising:
increasing the value of the first output voltage in accordance with a determination that a DC voltage converted from the first output voltage is below a predetermined threshold.

12. The method of claim 9, further comprising:
in response to detecting a power failure of the main power supply, maintaining a voltage applied to the magnetic bearing system such that the value of the voltage applied to the magnetic bearing system does not reduce in response to reduction of the estimated rotation speed of the PMSM.

13. The method of claim 9, wherein the first output voltage to power the magnetic bearing system in the second operating mode and the current within the PMSM are configured to be opposite in phase by setting, by the control unit, a reference rotation speed lower than the estimated rotation speed.

14. The method of claim 9, wherein detecting a power failure of the main power supply includes detecting more than a threshold amount of decrease in a threshold amount of time in a voltage supplied by the main power supply.

15. The method of claim 9, wherein detecting a power failure of the main power supply includes detecting more than a threshold amount of decrease in a threshold amount of time in a current supplied by the main power supply.

16. The method of claim 9, wherein the estimated rotation speed of the PMSM is determined based on an estimated load torque of the PMSM.

\* \* \* \* \*